US 11,740,537 B2

(12) United States Patent
Umeki et al.

(10) Patent No.: US 11,740,537 B2
(45) Date of Patent: Aug. 29, 2023

(54) OPTICAL SIGNAL PROCESSING CIRCUIT

(71) Applicant: Nippon Telegraph and Telephone Corporation, Tokyo (JP)

(72) Inventors: Takeshi Umeki, Musashino (JP); Takushi Kazama, Musashino (JP); Koji Embutsu, Musashino (JP); Takahiro Kashiwazaki, Musashino (JP); Osamu Tadanaga, Musashino (JP); Nobutatsu Koshobu, Musashino (JP); Ryoichi Kasahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/610,262

(22) PCT Filed: May 28, 2019

(86) PCT No.: PCT/JP2019/021096
§ 371 (c)(1),
(2) Date: Nov. 10, 2021

(87) PCT Pub. No.: WO2020/240697
PCT Pub. Date: Dec. 3, 2020

(65) Prior Publication Data
US 2022/0236622 A1    Jul. 28, 2022

(51) Int. Cl.
*G02F 1/377*    (2006.01)
*G02F 1/39*    (2006.01)
(52) U.S. Cl.
CPC ............... *G02F 1/377* (2013.01); *G02F 1/39* (2013.01)

(58) Field of Classification Search
CPC .................................. G02F 1/377; G02F 1/39
See application file for complete search history.

(56) References Cited

U.S. PATENT DOCUMENTS

2003/0231890 A1    12/2003    Asobe et al.

FOREIGN PATENT DOCUMENTS

| JP | 2003-121894 A | 4/2003 |
| JP | 39-71660 B2 | 6/2007 |

(Continued)

OTHER PUBLICATIONS

M. H. Chou et al., *Stability and Bandwidth Enhancement of Difference Frequency Generation (DFG)-Based Wavelength Conversion by Pump Detuning*, Electronics Letters, vol. 35, No. 12, 1999, pp. 978-990.

*Primary Examiner* — Daniel Petkovsek
(74) *Attorney, Agent, or Firm* — Workman Nydegger (57) ABSTRACT

An optical signal processing device includes: a light source which generates a fundamental wave light; an optical modulator which modulates the fundamental wave light, and generates a fundamental wave light having a plurality of carriers synchronized in phase; an optical filter which passes through required components among the plurality of carriers; a first second-order nonlinear optical element on which a light which passes through the optical filter is incident, and which generates a second harmonic of the fundamental wave light; and a second second-order nonlinear optical element on which a signal light and the second harmonic are incident, the second second-order nonlinear optical element performing nondegenerate parametric amplification, wherein the second second-order nonlinear optical element has an output unit for picking up a wavelength converted (Continued)

light corresponding to difference in frequency between the signal light and the second harmonic or an amplified light of the signal light.

8 Claims, 7 Drawing Sheets

(56) References Cited

FOREIGN PATENT DOCUMENTS

| | | | | |
|---|---|---|---|---|
| JP | 2017-156597 A | | 9/2017 | |
| JP | 2020144164 A | * | 9/2020 | ............... G02F 1/39 |
| WO | WO-2012098911 A1 | * | 7/2012 | ........... G02F 1/3532 |

* cited by examiner

OPTICAL SIGNAL PROCESSING CIRCUIT

TECHNICAL FIELD

The present invention relates to an optical signal processing device capable of performing wavelength conversion or optical amplification which is used in an optical communication system or a laser apparatus.

BACKGROUND ART

In an optical communication system, an erbium doped optical fiber amplifier (EDFA) has been popularly used for relaying signals which are attenuated as the signals propagate through an optical fiber. The EDFA allows the incidence of an excitation light into the optical fiber doped with erbium in the optical fiber (erbium-doped fiber (EDF)) and performs stimulated emission thus amplifying the incident light by guiding the excitation light into the EDF and emitting the excitation light from the EDF. Until the EDFA has been put into practice, a method has been used where an attenuated light is once converted into an electric signal, and after a digital signal is discriminated, the electric signal is again converted into an optical signal. A large number of optical parts and a large number of electric parts become necessary for performing this light-to-electricity-to-light conversion and hence, a relay cost of optical communication has been large. However, after the EDFA has been put into practice, an optical signal can be amplified just in the state of light without the need to perform light to electricity conversion, and signals of wavelength division multiplexing (WDM) which enables transmission of signals by carrying different information on a plurality of wavelengths can be collectively amplified. Accordingly, amplification and relay of optical signals can be carried out with the simple configuration and hence, an optical relay cost can be remarkably reduced. Particularly, in an optical communication network where signals are transmitted for a long distance, it is not an overstatement to say that the overall system is designed on the premise of using the EDFA.

Recently, because of versatility of information communication technology services, an optical communication system which supports a backbone of a communication network is required to further increase transmission capacity. According to Shannon's theory of communication, a frequency utilization efficiency given by a ratio of transmission capacity per unit frequency band is given as $\log_2(1+S/N)$ with respect to a signal to noise (S/N) ratio. Accordingly, an upper limit of the S/N ratio determines an upper limit of transmission capacity in principle. An S/N ratio in a receiver of optical communication is proportional to power of an optical signal under a condition where a so-called shot noise is dominant. Accordingly, to increase frequency utilization efficiency, the transmission of signals with high optical power is reasonable in principle. However, in an actual transmission of signals, a nonlinear optical effect exists in an optical fiber which is a transmission medium of optical communication. With respect to this nonlinear optical effect, there has been pointed out a phenomenon where an S/N ratio of optical signals is deteriorated to the contrary due to the nonlinear optical effect when transmission power is increased more than necessary. This deterioration of the S/N ratio is referred to as a nonlinear Shannon limit, and has been discussed as a phenomenon which may restrict an upper limit of transmission capacity of an optical communication system.

As described above, because of such a nonlinear Shannon limit, with respect to frequency utilization efficiency in an optical communication system, an upper limit in principle is gradually recognized. To further increase communication capacity, the extension of a frequency band used in optical communication becomes a fundamental task.

CITATION LIST

Patent Literature

Patent Literature 1: Japanese Patent No. 3971660

Non-Patent Literature

Non-Patent Literature 1: M. H. Chou, I. Brener, K. R. Parameswaran and M. M. Fejer, "Stability and bandwidth enhancement of difference frequency generation (DFGI-based wavelength conversion by pump detuning", ELECTRONICS LETTERS 10 Jun. 1999 Vol. 35 No. 12, pp 978-990

SUMMARY OF THE INVENTION

Technical Problem

However, in an optical communication system which uses the above-mentioned EDFA, there still exist the following drawbacks. A wavelength band which can be amplified by an EDFA popularly used in a current optical communication system is limited to a C band (1530 to 1565 nm) and an L band (1565 to 1625 nm). Accordingly, the current optical communication system is constructed on the premise of the use of these wavelength bands. A transparent wavelength band of an optical fiber itself is extremely broad and hence, if wavelength bands other than the above-mentioned wavelength bands can be used, transmission capacity in optical communication can be largely increased.

In technology similar to an EDFA, an optical amplifier which uses an optical fiber doped with ytterbium (ytterbium doped fiber amplifier (YDFA)) has been developed. A wavelength band which can be amplified by the YDFA is a 1.06 μm band. In this wavelength band, the propagation through a single mode fiber (SMF) which is usually used is no more single mode propagation. The SMF is not suitable for transmission of high speed signals in the 1.06 μm band. To construct a communication system using the YDFA, it is necessary to use a particular optical fiber which differs from a conventional optical fiber. Accordingly, when the YDFA is used in the optical communication system, there exists a drawback with respect to affinity between the YDFA and an existing optical fiber communication network.

The present invention has been made in view of the above-mentioned drawbacks, and it is an object of the present invention to provide an optical signal processing device which can amplify optical signals having a band which includes a wavelength band other than a C band and an L band where the wavelength cannot be amplified by an EDFA while amplifying the optical signals in the form of light without the need to perform light to electricity conversion.

Means for Solving the Problem

Examples of embodiments of the present invention are characterized by including the following configurations for achieving the above-mentioned object.

According a first aspect of the present invention, there is provided an optical signal processing device which includes: a light source which generates a fundamental wave light; an optical modulator which modulates the fundamental wave light, and generates a fundamental wave light having a plurality of carriers which are synchronized in phase; an optical filter which transmits required components among the plurality of carriers; a first second-order nonlinear optical element on which a light which passes through the optical filter is incident, and which generates a second harmonic of the fundamental wave light; and a second second-order nonlinear optical element on which a signal light and the second harmonic are incident, and which performs nondegenerate parametric amplification, wherein a waveguide of the first second-order nonlinear optical element and a waveguide of the first second-order nonlinear optical element have a periodically poled structure, and the second second-order nonlinear optical element has an output unit for picking up a wavelength converted light corresponding to difference in frequency between the signal light and the second harmonic or an amplified light of the signal light.

According to a second aspect of the present invention, there is provided an optical signal processing device which includes: a light source which generates a fundamental wave light; a first second-order nonlinear optical element which generates a second harmonic of the fundamental wave light; and a second second-order nonlinear optical element on which a signal light and the second harmonic are incident, and which performs nondegenerate parametric amplification, wherein the second second-order nonlinear optical element has an output unit for picking up a wavelength converted light corresponding to difference in frequency between the signal light and the second harmonic or an amplified light of the signal light, and in a waveguide of the second second-order nonlinear optical element, the periodically poled structure is formed of periodic structures having different lengths which are arranged in multiple stages.

Effects of the Invention

According to the present invention, it is possible to provide the optical signal processing device which has a band including a wavelength band which cannot be amplified by an EDFA in a wavelength band other than a C band and an L band, and can amplify an optical signal in the form of light without the need to perform light to electricity conversion.

DESCRIPTION OF EMBODIMENTS

Hereinafter, the configuration of an optical signal processing device according to the present invention is described in detail with reference to drawings. The present invention is not limited to the described content of embodiments described hereinafter, and it is apparent for those who are skilled in the art to variously change the configuration and the detail of the optical signal processing device without departing from the gist of the invention disclosed in the present specification and the like. The configurations according to the embodiments which differ from each other can be carried out by suitably combining the configurations to each other. In the configurations of the invention described hereinafter, identical parts or parts having substantially the same functions are given with the same symbols, and the repeated description of such parts is omitted.

With respect to optical amplification using a laser medium formed of a rare earth such as the EDFA described previously, since the transition between energy levels which the rare earth has is used, there is a limit in selecting a wavelength band which can be amplified. As a method which realizes optical amplification without having such a limit, there exists a method which uses parametric amplification which uses a second-order or third-order nonlinear optical medium. As the third-order nonlinear optical medium, an example which uses four-wave mixing in an optical fiber is exemplified as a representative example. However, a nonlinear optical effect of an optical fiber has a possibility of becoming a factor which deteriorates an S/N ratio of the optical signal as described above and hence, there exists a drawback, in obtaining an optical amplifier having a low noise. On the other hand, as the second-order nonlinear optical medium, a method which uses an optical waveguide containing periodically poled lithium niobate (PPLN) is exemplified as a representative example. For example, non-patent literature 1 discloses that it is possible to perform an optical amplification operation in a broad band by using difference frequency generation which is a second-order nonlinear optical effect obtained using PPLN. In the method which uses PPLN, a third-order nonlinear effect can be ignored and hence, it may be considered that there is substantially no deterioration of quality of signals caused by a nonlinear optical effect.

Figure 1:
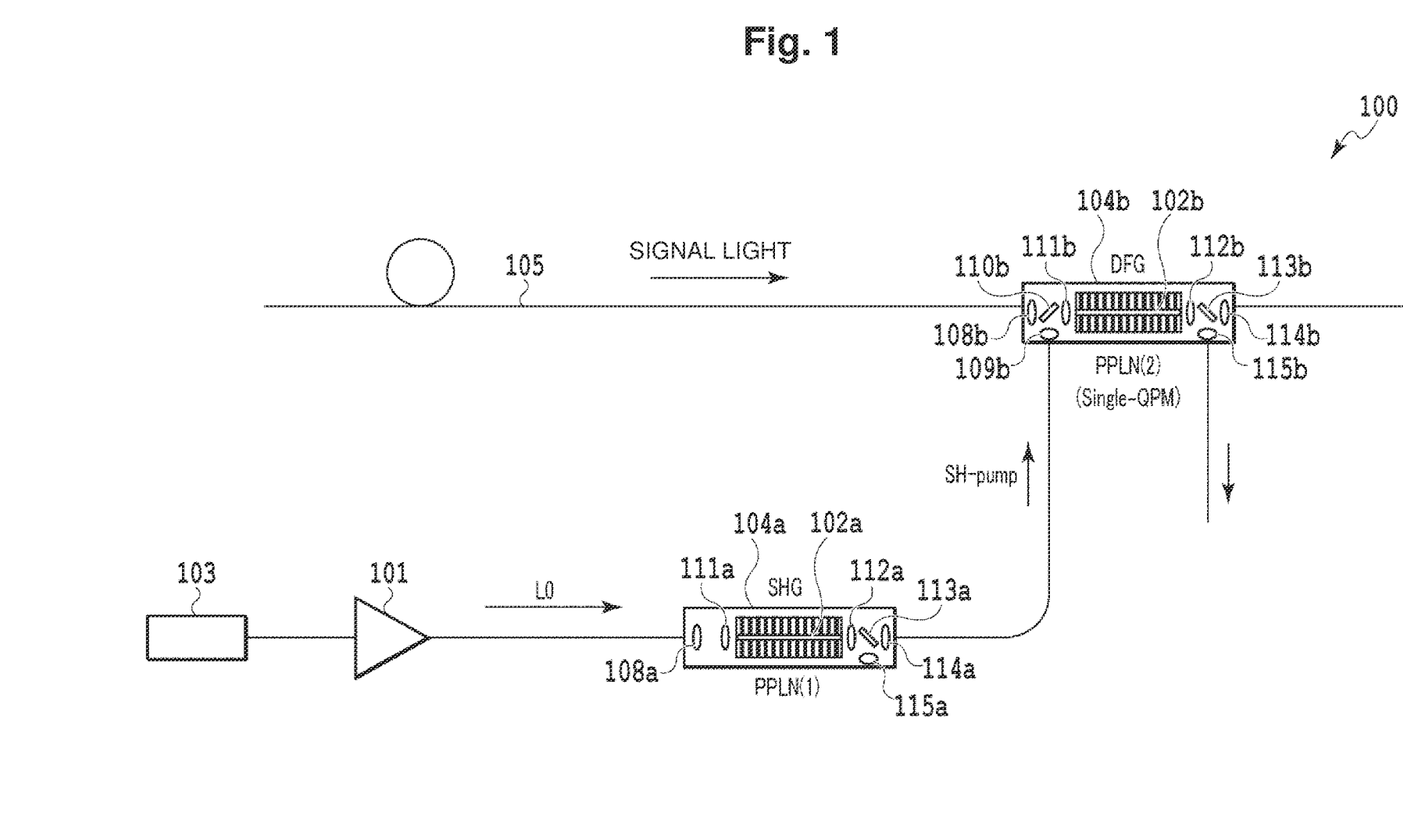
FIG. 1 is a view showing a conventional optical signal processing device.

FIG. 1 shows the basic configuration of an optical signal processing device 100 which functions both as: an optical parametric amplifier which uses a second-order nonlinear optical medium such as a conventional PPLN waveguide; and a wavelength convertor (Non-Patent Literature 1). In the conventional configuration, two PPLN waveguides 102a, 102b having the same quasi phase matching condition are used.

The optical signal processing device 100 shown in FIG. 1 is an optical signal processing device which includes: a light source 103 which generates a fundamental wave light; a first second-order nonlinear optical element 104a which generates a second harmonic of the fundamental wave light; a second second-order nonlinear optical element 104b on which a signal light and a second harmonic are incident. The waveguide 102a of the first second-order nonlinear optical element and the waveguide 102b of the first second-order nonlinear optical element form the optical signal processing device having a periodically poled structure. The optical signal processing device 300 further includes an erbium doped optical fiber amplifier (EDFA) 101 for obtaining power sufficient for obtaining a nonlinear optical effect of a plurality of carriers; and an optical fiber 105 for transmitting signal lights to the second second-order nonlinear optical element 104b.

A fundamental wave light in a 1550 nm band is generated from the laser light source 103 used in optical communication. The fundamental wave light is amplified using the EDFA 101 for obtaining power sufficient for obtaining a nonlinear optical effect. Then, the fundamental wave light is incident on the PPLN waveguide 102a which forms the first second-order nonlinear optical element 104a and hence, a second harmonic is generated. By allowing a signal light and the second harmonic to be incident on the PPLN waveguide 102a which forms the second second-order nonlinear optical element 104b, and by performing nondegenerate parametric amplification, amplified light of the signal light is outputted. At this point of time, simultaneously, in a difference frequency generation (DFG) step, wavelength converted light (also referred to as idler light) which corresponds to difference in frequency between the signal light and the second harmonic is also outputted. On an output side, the optical signal processing device 100 functions as an optical amplifier when only an amplified signal light is picked up, and the optical signal processing device 100 functions as a wavelength convertor when only wavelength converted light (idler light) is picked up.

Figure 2A:
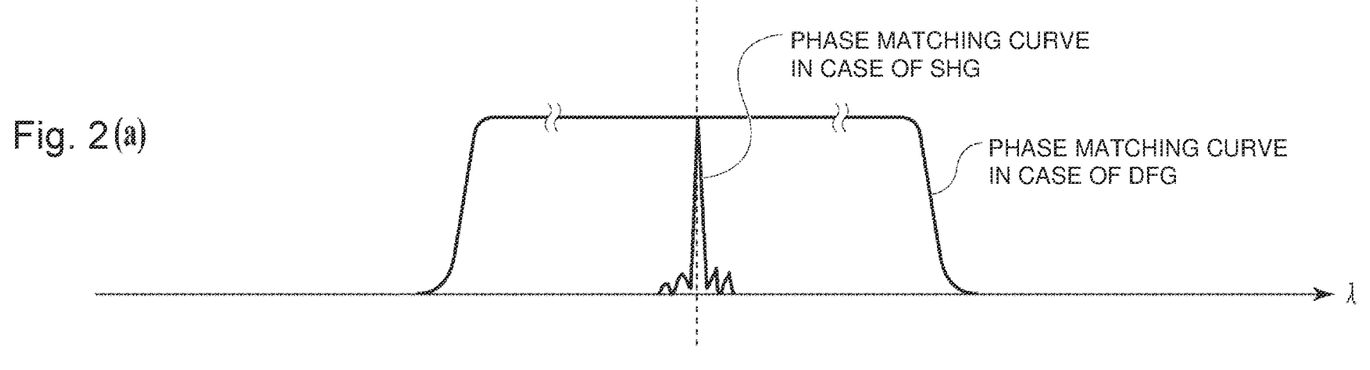
FIGS. 2(a) and 2(b) are views for describing optical parametric amplification and a difference frequency generation (DFG) band of the conventional optical signal processing device.
Figure 2B:
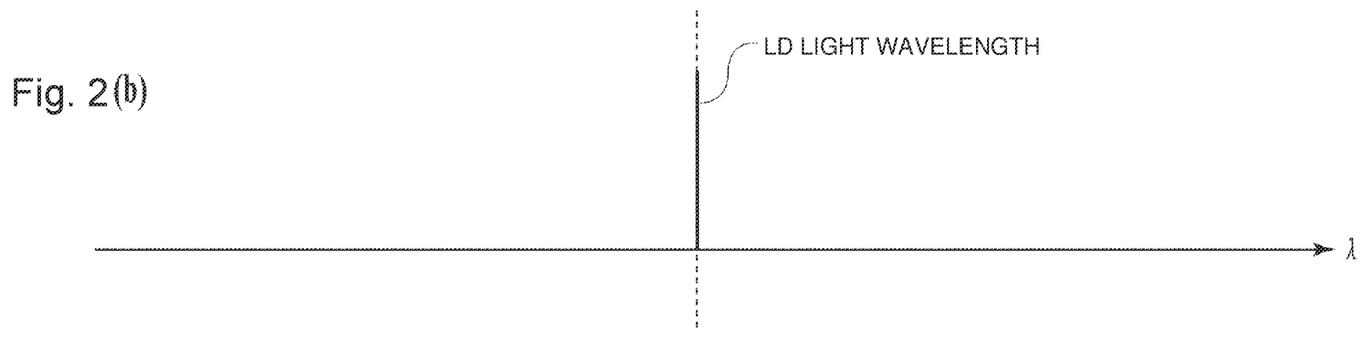

FIG. 2 is a view for describing optical parametric amplification and difference frequency generation (DFG) band of the conventional optical signal processing device. Here, although the description is made using a difference frequency generation (DFG) step, substantially the same configuration is adopted in the optical parametric amplification step. A fundamental wave light is laser light having a single wavelength outputted from a single laser light source (FIG. 2(b)). A phase matching band with respect to a second harmonic of a PPLN waveguide is narrower than a phase matching band with respect to difference frequency generation but is sufficiently broader than a line width of the laser light of the fundamental wave light.

Assuming a fundamental wave wavelength $\lambda 0$ (frequency: $\omega 0$) as 1545 nm and an excitation light wavelength $\lambda p$ (frequency: $2\omega 0$) as 772.5 nm, a wavelength conversion band of the PPLN waveguide is described.

By inputting an excitation light and a signal light into the second PPLN waveguide 102b, conversion light is generated by difference frequency generation in the second PPLN waveguide 102b. For example, assuming a signal light wavelength $\lambda s$ (frequency: $\omega s$) as 1540 nm, conversion light having a wavelength 1550 nm is generated in accordance with $2\omega 0 - \omega s$. A conversion light is generated in the form that the conversion light is folded on a wavelength axis about a fundamental wave wavelength $\lambda 0$.

In the second PPLN waveguide 102b, a quasi phase matching condition is satisfied between three waves, that is, the excitation light, the signal light and the conversion light. That is, assuming respective effective refractive indexes of the excitation light, the signal light and the conversion light in the waveguide as np, ns and nc, the second PPLN waveguide 102b has a domain inversion structure of an inversion cycle $\Lambda$ which satisfies the following equation.

$$np/\lambda p - ns/\lambda s - nc/\lambda c = 1/\Lambda \qquad \text{(equation 1)}.$$

At this stage of processing, even when a signal light wavelength is changed, the same conversion efficiency is obtained between the conversion light and the excitation light at the frequency $2\omega 0 - \omega s$ provided that the equation 1 is satisfied. To be more specific, for example, assuming the signal light wavelength $\lambda s$ (frequency: $\omega s$) as 1539 nm, conversion light of a wavelength 1551 nm is generated in accordance with $2\omega 0 - \omega s$. At this stage of processing, the effective refractive indexes ns and nc also change. However, the effective refractive index nc becomes smaller by an amount that the effective refractive index ns is increased because of dispersion of a material and hence, the (equation 1) can be satisfied even when the signal light wavelength is changed. Accordingly, the optical signal processing device 100 has an advantageous effect that a broad wavelength conversion band shown in FIG. 2(a) can be obtained.

However, the dispersion of the material is not linear and hence, an increase amount of the effective refractive index ns and a decrease amount of the effective refractive index nc are not completely equal and hence, the conversion efficiency is gradually lowered whereby the band is restricted. In the conventional optical signal processing device, the band of approximately 60 nm can be obtained about the fundamental wave light wavelength (1545 nm in this example). However, such a wavelength band is a band where a bandwidth can be amplified even by an EDFA and hence, an advantage brought about by replacement of the EDFA is small.

Embodiment 1

In the embodiment of the present invention, an optical signal processing device 300 is described where optical parametric amplification and wavelength conversion can be realized in a broad band by using a second-order nonlinear optical medium such as the PPLN and by making use of a second-order nonlinear optical medium having a plurality of excitation lights which differ in wavelength or a plurality of quasi phase matching conditions.

Figure 3:
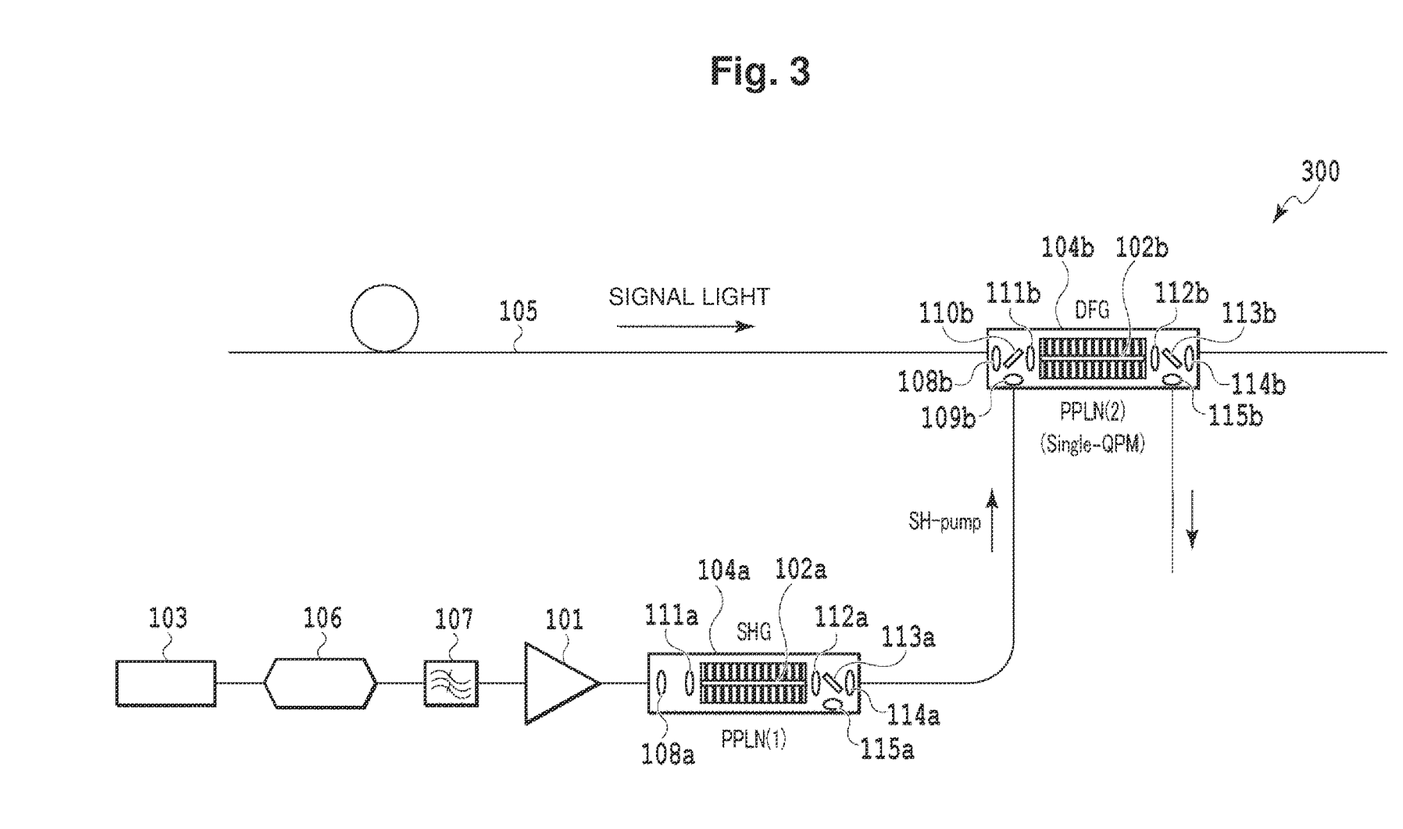
FIG. 3 is a view showing an optical signal processing device according to an embodiment 1 of the present invention.

FIG. 3 shows the configuration of the optical signal processing device 300 according to the first embodiment.

The optical signal processing device 300 is an optical signal processing device which includes: a light source 103 which generates a fundamental wave light; a optical modulator 106 which modulates the fundamental wave light, and generates a fundamental wave light having a plurality of carriers which are synchronized in phase; an optical filter 107 which transmits required components among the plurality of carriers; a first second-order nonlinear optical element 104a on which a light transmitted from the optical filter is incident, and generates a second harmonic of the fundamental wave light; and a second second-order nonlinear optical element 104b on which a signal light and the second harmonic are incident, and performs nondegenerate parametric amplification. A waveguide 102a of the first second-order nonlinear optical element and a waveguide 102b of the first second-order nonlinear optical element have a periodically poled structure. The second second-order nonlinear optical element 104b is an optical signal processing device which includes an output unit for picking up a wavelength converted light corresponding to difference in frequency between the signal light and the second harmonic or an amplified light of a signal light. The optical signal processing device 300 further includes: an erbium doped optical fiber amplifier (EDFA) 101 for acquiring power sufficient for obtaining nonlinear optical effect of the plurality of carriers; and an optical fiber 105 for transmitting the signal light to the second second-order nonlinear optical element 104b.

In the optical signal processing device which functions both as the optical parametric amplifier and the wavelength convertor using the first and second periodically poled lithium niobate (PPLN) waveguides 102a, 102b of the first and second second-order nonlinear optical elements 104a, 104b, the optical signal processing device 300 includes the optical modulator 106 and the optical filter 107 which are connected to the first periodically poled lithium niobate (PPLN). With the use of the optical modulator and the optical filter, a single wavelength light is converted into a fundamental wave light having a plurality of carriers of arbitrary intensities and frequencies, and the fundamental wave light is incident on a first optical parametric amplifier (wavelength convertor) which is the first second-order nonlinear optical element 104a. A second harmonic emitted from the first optical parametric amplifier (wavelength convertor) is incident, together with a signal light, on a second optical parametric amplifier (wavelength convertor, wavelength conversion device) which is the second second-order nonlinear optical element 104b.

In this embodiment, two PPLN waveguides 102a, 102b having the same quasi phase matching condition are used. A fundamental wave light of a 1550 nm band is generated from the laser light source 103 used in optical communication, and the fundamental wave light is modified by a specific frequency using the optical modulator 106. An intensity modulator or a phase modulator used in optical communication is used as the optical modulator 106. With such optical modulation, a fundamental wave light having a plurality of carriers of synchronized phases is generated. Next, the optical bandpass filter (optical filter) 107 transmits only required components among a plurality of carriers. As the optical bandpass filter 107, a fixed type filter of a band shape using a dielectric multi-layered film or the like may be used, or a programmable optical filter which uses an LCOS or the like may be used. By using the programmable optical filter, the plurality of required carriers can be picked up, and intensities of the respective carrier components can be properly adjusted.

The optical bandpass filter 107 transmits the fundamental wave light, and the fundamental wave light is amplified using the erbium doped optical fiber amplifier (EDFA) 101 for obtaining power sufficient for obtaining a nonlinear optical effect of the plurality of carriers. Then, the amplified fundamental wave light is incident on the PPLN waveguide 102a of the first second-order nonlinear optical element 104a and hence, a second harmonic is generated. By allowing a signal light and the second harmonic to be incident on the PPLN waveguide 102b which forms the second second-order nonlinear optical element 104b, and by performing nondegenerate parametric amplification, an amplified light of the signal light is outputted. At this point of time, simultaneously, in a difference frequency generation (DFG) step, wavelength converted light (also referred to as idler light) which corresponds to difference in frequency between the signal light and the second harmonic is also outputted. On an output side, the optical signal processing device 300 functions as an optical amplifier when only an amplified signal light is picked up, and the optical signal processing device 300 functions as a wavelength convertor when only wavelength converted light (idler light) is picked up.

The light incident on the first second-order nonlinear optical element 104a is collimated by a collimator lens 108a, is condensed by a condenser lens 111a, and is incident on the PPLN waveguide 102a. A light emitted from the PPLN waveguide 102a is collimated by a collimator lens 112a, is split by a directional coupler using an optical waveguide such as an optical fiber or a multi mode interference type multi/demultiplexer 113a, and is condensed by a condenser lens 114a, and an excitation light is emitted from the first second-order nonlinear optical element 104a. The light emitted from the first second-order nonlinear optical element 104a through a lens 115a is monitored. The excitation light incident on the second second-order nonlinear optical element 104b is collimated by a collimator lens 109b, is multiplexed with a signal light incident from the optical fiber 105 through a collimator lens 108b in a directional coupler which uses an optical waveguide such as an optical fiber or a multi mode interference type multi/demultiplexer 110b. The multiplexed light is condensed by the condenser lens 111b, and is incident on the PPLN waveguide 102b. A light emitted from the PPLN waveguide 102b is collimated by a collimator lens 112b, is split by a directional coupler which uses an optical waveguide such as an optical fiber or a multi mode interference type multi/demultiplexer 113b, and is condensed by a condenser lens 114b. A condensed light is emitted from the first second-order nonlinear optical element 104a. The light emitted from the first second-order nonlinear optical element 104b through a lens 115b is monitored.

Design requirements of the optical signal processing device 300 are described. The optical signal processing device 300 is a wavelength conversion device which generates a differential frequency light having a wavelength $\lambda_2$ which corresponds to differential frequency between a signal light having a wavelength $\lambda_1$ and an excitation light having a wavelength $\lambda_3$, and performs parametric amplification of the signal light having the wavelength $\lambda_1$. The optical signal processing device 300 is an optical signal processing device which includes: means for generating excitation lights having wavelengths $\lambda_{3,i}$ (i=−n , , , −2, −1, 0, +1, +2 , , , +n); means for multiplexing excitation lights and a signal light, for example, a directional coupler which uses an optical waveguide such as an optical fiber or the multi mode interference type multi/demultiplexer 113b; and a wavelength conversion device (quasi phase matching wavelength conversion element) on which the signal light having the wavelength $\lambda_1$ and the excitation lights having the wavelengths $\lambda_{3,i}$ are incident, and performs parametric amplification of the signal light using the excitation lights. In the optical signal processing device 300, assuming a modulation cycle of spatial distribution of a nonlinear constant of the quasi phase matching wavelength conversion element as $\Lambda$, the following equation is satisfied between a propagation constant $\beta(\lambda_{QPM})$ at a quasi phase matching wavelength $\lambda_{QPM}$ and a propagation constant $\beta(2\lambda_{QPM})$ at a wavelength $2\lambda_{QPM}$.

$$\beta(\lambda_{QPM}) - 2\beta(2\lambda_{QPM}) = \frac{2\pi}{\Lambda}.$$

At least one of the wavelengths $\lambda_{3,i}$ of the excitation lights has a shorter wavelength than the quasi phase matching wavelength $\lambda_{QPM}$, and the following equation is satisfied between the propagation constant $\beta$ ($\lambda_3$,i) at the wavelength $\lambda_3$ of the excitation light, the propagation constant $\beta$ ($\lambda_1$) at the wavelength $\lambda_1$ of the signal light and the propagation constant $\beta$ ($\lambda_2$) at the wavelength $\lambda_2$ of the differential frequency light.

$$\beta(\lambda_{3,i}) - \beta(\lambda_1) - \beta(\lambda_2) = \frac{2\pi}{\Lambda}$$

The second-order nonlinear optical element (quasi phase matching wavelength conversion element) 104b is the waveguide 102b which is made of a nonlinear medium, that is, lithium niobate having a periodically poled structure. The second-order nonlinear optical element 104b generates the wavelength $\lambda_2$ of the differential frequency light which satisfies the following equation by a second-order nonlinear optical effect generated in the nonlinear medium.

$$\frac{1}{\lambda_3} = \frac{1}{\lambda_1} + \frac{1}{\lambda_2}$$

In this embodiment, the means for generating the excitation lights having the wavelengths $\lambda_{3,i}$ (i=−n, , , −2, −1, 0, +1, +2, , , +n) includes the laser light source (light source) 103 which generates a fundamental wave light having the wavelength $2\lambda_{3,0}$, and the optical modulator 106, the optical filter 107 and the optical amplifier 101. The means generates the excitation lights by generating a second harmonic of the fundamental wave light.

With such a configuration, the optical signal processing device 300 can acquire advantageous effects described below which cannot be acquired by the conventional optical signal processing device.

Figure 4A:
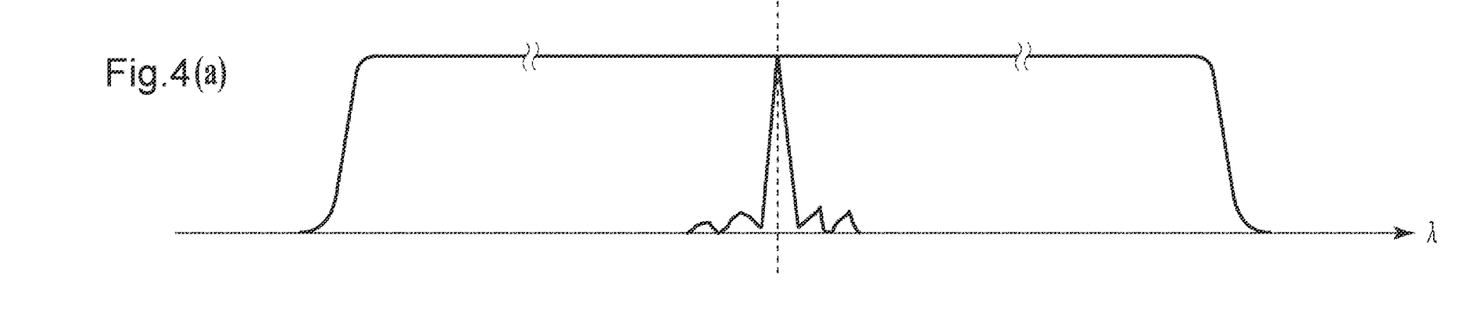
FIG. 4(a) is a view for describing optical parametric amplification and a difference frequency generation (DFG) band according to the embodiment 1 of the present invention.
Figure 4B:
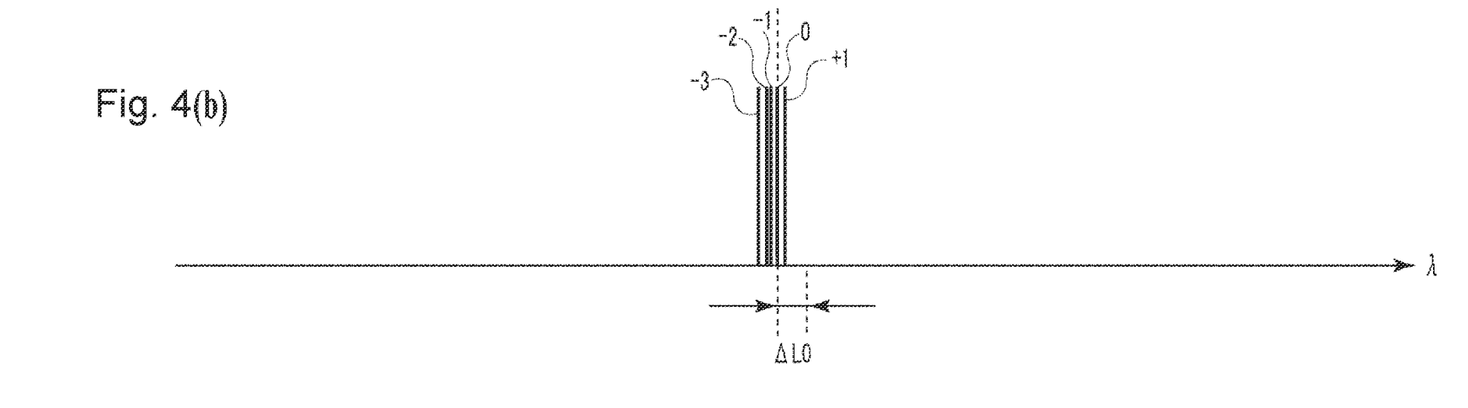
FIG. 4(b) is a view for describing the optical parametric amplification and the difference frequency generation (DFG) band according to the embodiment 1 of the present invention.

FIG. 4(a) and FIG. 4(b) are views for describing optical parametric amplification and a difference frequency generation (DFG) band of the present invention.

A fundamental wave light having a plurality of carriers is generated by cutting out carriers having synchronized phases which are generated by modulating a laser light having a single wavelength at a single frequency (FIG. 4(b)). More specifically, a wavelength $\lambda 0$ of a laser light having a single wavelength is set to 1545 nm (frequency ω0 being 194.04 THz), and the laser light is modulated using a single frequency of 10 GHz thus generating the fundamental wave light having a plurality of carriers, that is, five carriers.

Using the PPLN waveguide 102a of a length of 20 mm having a band which corresponds to a second harmonic of 50 GHz (0.4 nm) or more as the first second-order nonlinear optical element 104a, a fundamental wave light having a plurality of carriers is collectively converted into a second harmonic having a plurality of carriers. A signal light and the second harmonic are incident on the PPLN waveguide 102b of a length of 45 mm of the second second-order nonlinear optical element 104b, and nondegenerate parametric amplification is performed so that an amplified light of the signal light is outputted.

With the use of the second harmonic having the plurality of carriers, a light parametric step is generated where a light is excited with a wavelength different from a phase matching wavelength corresponding to the generation of the second harmonic in the second PPLN waveguide 102b. More specifically, for example, a second harmonic generation light of a wavelength shorter than the phase matching wavelength in the second PPLN waveguide 102b has a band characteristic where a curve of a parametric gain is split in two. That is, different amplification bands are generated in a plurality of respective carriers, and the plurality of carries have synchronized phases. Accordingly, the bands of these carriers are synthesized coherently and hence, an amplification band in a broad band which cannot be realized by the conventional configuration can be realized (FIG. 4(a)).

Figure 5:
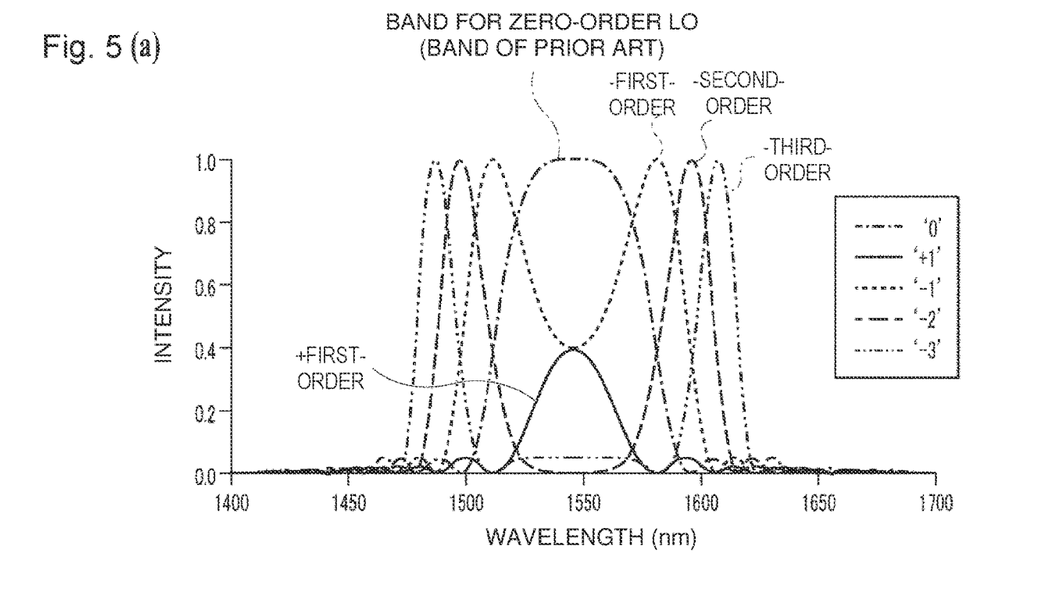
FIG. 5(a) is a view showing an amplification band generated by a second harmonic light.
FIG. 5(b) is a view showing a synthetic band according to the embodiment 1 of the present invention.

FIG. 5(a) and FIG. 5(b) show amplification bands generated by the second harmonic lights corresponding to respective carriers when a fundamental wave light having a plurality of, that is, five carriers at an interval of 10 GHz is used, and a synthetic band of the amplification bands, that is, the band according to the embodiment 1 of the present invention. As the plurality of, that is, five carriers arranged at the interval of 10 GHz, a zero-order carrier corresponding to a wavelength $\lambda 0$ (frequency ω0) of a laser light having a single wavelength, a −first-order carrier, a −second-order carrier and a −third-order carrier of the laser light each having a wavelength shorter than the wavelength $\lambda 0$, and a +first-order carrier of the laser light having a wavelength longer than the wavelength $\lambda 0$ are used. Wavelength (nm) is taken on an abscissas, and intensity is taken on ordinates.

A band formed by using the second harmonic light generated from the fundamental wave light on the zero-order carrier as an excitation light corresponds to a band of the conventional optical signal processing device, and is a band of approximately 60 nm about the wavelength $\lambda_0$. A band formed from the fundamental wave light on the −first-order carrier has a band characteristic where a curve of a gain is split in two. Bands formed from the fundamental wave light on the −second-order carrier and the −third-order carrier have band characteristics where the wavelength is split from a center wavelength to a shorter wavelength and a longer wavelength. A band formed from the fundamental wave light on the +first-order carrier is not split in two, has a band narrower than the band formed from the fundamental wave light on the zero-order carrier, and a gain is also small.

It is understood that the synthetic band generated from the fundamental wave light having the zero-order carrier, the −first-order carrier, the −second-order carrier, the −third-order carrier, and the +first-order carrier, that is, the band according to the present invention has a broad band characteristic that the band has a flat top which extends over 100 nm.

In this embodiment, five carriers are used as the plurality of carriers. However, the band which cannot be realized by the conventional amplification band can be realized by using the larger number of carriers or by using the fundamental wave light having only two carriers, that is, the zero-order carrier and the −first-order carrier.

In this embodiment, a second harmonic having a plurality of carriers is generated after generating a fundamental wave generation light having a plurality of carriers by modifying a fundamental wave light. However, it is also possible that a second harmonic of a fundamental wave having a single wavelength is generated and, thereafter, optical modulation is performed using an optical modulator which is operated at the wavelength.

However, the configuration described in the embodiment where a fundamental wave light is modified can use optical parts practically popularly used in an optical communication field such as an optical modulator and an optical bandpass filter. Accordingly, the present configuration can be realized stably and at a low cost.

In this embodiment, broad band amplification and wavelength conversion are realized by driving the PPLN waveguide having a single phase matching wavelength using an excitation light formed of a plurality of carriers. Accordingly, in this embodiment, magnitude of voltage and frequency applied to the optical modulator, the selection of the number of required carriers by the optical bandpass filter, and intensities of respective carriers can be adjusted as desired.

Embodiment 2

Figure 6:
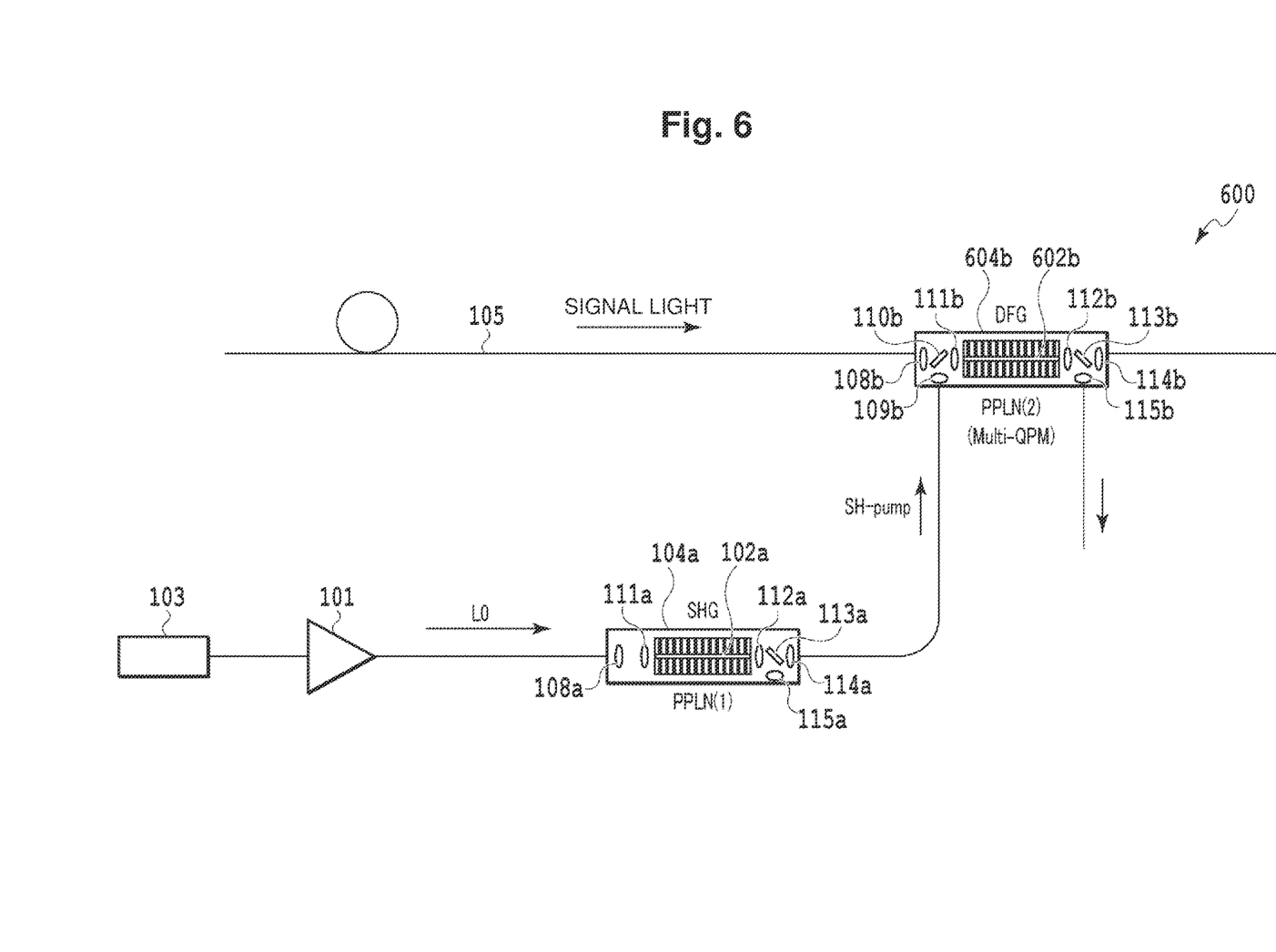
FIG. 6 is a view showing an optical signal processing device according to an embodiment 2 of the present invention.

FIG. 6 shows the configuration of the second embodiment.

This embodiment realizes the configuration which can perform stable amplification with a more compact scheme. This embodiment can realize the broad band amplification substantially at the same level as the first embodiment using a fundamental wave light having a single wavelength and a second harmonic light of the fundamental wave light without using a fundamental wave light having a plurality of carriers and a second harmonic light of the fundamental wave light.

An optical signal processing device 600 is an optical signal processing device 600 which includes: a light source 103 which generates a fundamental wave light; a first second-order nonlinear optical element 104a which generates a second harmonic of the fundamental wave light; a second second-order nonlinear optical element 604b on which a signal light and the second harmonic are incident and which performs nondegenerate parametric amplification. The second second-order nonlinear optical element 604b includes an output unit for picking up a wavelength converted light corresponding to difference in frequency between a signal light and a second harmonic or an amplified light of the signal light. A waveguide 102a of the first second-order nonlinear optical element 104a and a waveguide 602b of the second second-order nonlinear optical element 604b have a periodically poled structure. Periodic structures which differ in periodically poled structure from each other in length are disposed in the waveguide 602b of the second second-order nonlinear optical element in multiple stages. The optical signal processing device 600 includes: an erbium doped optical fiber amplifier (EDFA) 101 for obtaining power sufficient for obtaining a nonlinear optical effect of a plurality of carriers; and an optical fiber 105 for transmitting a signal light to the second second-order nonlinear optical element 604b.

In the optical signal processing device 600 which functions as all of an element which uses the second periodically poled lithium niobate (PPLN) waveguide 602b of the second second-order nonlinear optical element 604b, an optical parametric amplifier and a wavelength convertor, a single wavelength light generated from the laser light source 103 is incident on a first optical parametric amplifier (wavelength convertor) as a fundamental wave light. A second harmonic emitted from the first optical parametric amplifier (wavelength convertor) which forms the first second-order nonlinear optical element 104a is incident, together with a signal light, on the second optical parametric amplifier (wavelength convertor) which is the second second-order nonlinear optical element 604b where the periodically poled structure in the waveguide is formed of periodic structures having different lengths which are arranged in multiple stages.

In FIG. 6, a fundamental wave light of a 1550 nm band is generated from the laser light source used in optical communication and the fundamental wave light is amplified using the EDFA 101 for obtaining power sufficient for obtaining a nonlinear optical effect. Then, the amplified fundamental wave light is incident on the PPLN waveguide 102a which forms the first second-order nonlinear optical element 104a and hence, a second harmonic is generated. By allowing a signal light and the second harmonic to be incident on the PPLN waveguide 602b which forms the second second-order nonlinear optical element 604b, and by performing nondegenerate parametric amplification, an amplified light of the signal light is outputted. At this point of time, simultaneously, in a difference frequency generation (DFG) step, a wavelength converted light (also referred to as an idler light) which corresponds to difference in frequency between the signal light and the second harmonic is also outputted. On an output side, the optical signal processing device 600 functions as an optical amplifier when only an amplified signal light is picked up, and the optical signal processing device 600 functions as a wavelength convertor when only a wavelength converted light (an idler light) is picked up.

A light incident on the first second-order nonlinear optical element 104a is collimated by a collimator lens 108a, is condensed by a condenser lens 111a, and is incident on the PPLN waveguide 102a. A light emitted from the PPLN waveguide 102a is collimated by a collimator lens 112a, is split by a directional coupler using an optical waveguide such as an optical fiber or a multi mode interference type multi/demultiplexer 113a, and is condensed by a condenser lens 114a, and an excitation light is emitted from the first second-order nonlinear optical element 104a. The light emitted from the first second-order nonlinear optical element 104a through a lens 115a is monitored. The excitation light incident on the second second-order nonlinear optical element 604b is collimated by a collimator lens 109b, is multiplexed with a signal light incident from the optical fiber 105 through a collimator lens 108b in a directional coupler which uses an optical waveguide such as an optical fiber or a multi mode interference type multi/demultiplexer 110b. The multiplexed light is condensed by a condenser lens 111b, and is incident on the PPLN waveguide 602b. A light emitted from the PPLN waveguide 602b is collimated by a collimator lens 112b, is split by a directional coupler which uses an optical waveguide such as an optical fiber or a multi mode interference type multi/demultiplexer 113b, and is condensed by a condenser lens 114b. A condensed light is emitted from the second second-order nonlinear optical element 604b. The light emitted from the second second-order nonlinear optical element 604b through a lens 115b is monitored.

In this embodiment, the PPLN waveguide 602b which forms the second second-order nonlinear optical element is an element having a plurality of quasi phase matching characteristics. The plurality of quasi phase matching characteristics can be realized, for example, by disposing a plurality of periodic structures in multiple stages as a periodically poled structure in the PPLN waveguide. A chirp type periodic structure where characteristics are changed gradually within an element from a period of a certain characteristic to a period of a different characteristic may be provided. Alternatively, a multiple quasi-phase matching (QPM) element which can be realized by providing a certain fundamental period and by applying a spatial periodic phase modulation of a long period may be used.

In this embodiment, the cascade type PPLN waveguide 602b where periodic structures are provided in multiple stages is used. More specifically, the structure is adopted where five periods of 17.200 um, 17.202 um, 17.204 um, 17.206 um, and 17.208 um are arranged in a dependent manner for each 10 mm with respect to a total element length of 50 mm. Although the structure where five periods are arranged in a dependent manner is used in this embodiment, a PPLN waveguide having a plurality of peaks may be prepared by using a phase change frequency modulation structure called as a multiple QPM which is formed of a nonlinear constant frequency modulation structure where a phase is continuously changed for every period $\Lambda_0$ and a phase modulation structure where a phase change of a frequency modulation structure is repeated for every period $\Lambda_{ph}$ (for example, Patent Literature 1).

Design requirements of the optical signal processing device 600 are described. The optical signal processing device 600 is a wavelength conversion device which generates a differential frequency light having a wavelength $\lambda_2$ which corresponds to differential frequency between a signal light having a wavelength $\lambda_1$ and an excitation light having a wavelength $\lambda_3$, and performs parametric amplification of the signal light having the wavelength $\lambda_1$. The optical signal processing device 600 includes: means for generating an excitation light having a wavelength $\lambda_3$; means for multiplexing the excitation light and a signal light, for example, a directional coupler which uses an optical waveguide such as an optical fiber or a multi mode interference type multi/demultiplexer; and a quasi phase matching wavelength conversion element which is a wavelength conversion device on which a signal light having wavelength of $\lambda_1$ and an excitation light having a wavelength of $\lambda_3$ are incident and which performs parametric amplification of the signal light using the excitation light. Assuming a modulation cycle of spatial distribution of a nonlinear constant of the quasi phase matching wavelength conversion element as $\Lambda i$ ($i=-n, , , -2, -1, 0, +1, +2, , , +n$), the following equation is satisfied between a propagation constant $\beta(\lambda_{QPM,i})$ at a quasi phase matching wavelength $\lambda_{QPM,i}$ and a propagation constant $\beta(2\lambda_{QPM,i})$ at a wavelength $2\lambda_{QPM,i}$.

$$\beta(\lambda_{QPM,i}) - 2\beta(2\lambda_{QPM,i}) = \frac{2\pi}{\Lambda i}.$$

At least one of the wavelengths $2\lambda_{QPM,i}$ of the modulation cycle of the excitation light has a longer wavelength than the quasi phase matching wavelength $\lambda_3$, and the following equation is satisfied between the propagation constant $\beta(\lambda_3)$ at the wavelength $\lambda_3$ of the excitation light, the propagation constant $\beta(\lambda_1)$ at the wavelength $\lambda_1$ of the signal light and the propagation constant $\beta(\lambda_2)$ at the wavelength $\lambda_2$ of the differential frequency light.

$$\beta(\lambda_3) - \beta(\lambda_1) - \beta(\lambda_2) = \frac{2\pi}{\Lambda i}.$$

The second-order nonlinear optical element (quasi phase matching wavelength conversion element) 604b is the waveguide 602b which is made of a nonlinear medium, that is, lithium niobate having a periodically poled structure. The second-order nonlinear optical element 604b generates the wavelength $\lambda_2$ of the differential frequency light which satisfies the following equation by a second-order nonlinear optical effect generated in the nonlinear medium.

$$\frac{1}{\lambda_3} = \frac{1}{\lambda_1} + \frac{1}{\lambda_2}$$

Figure 7:
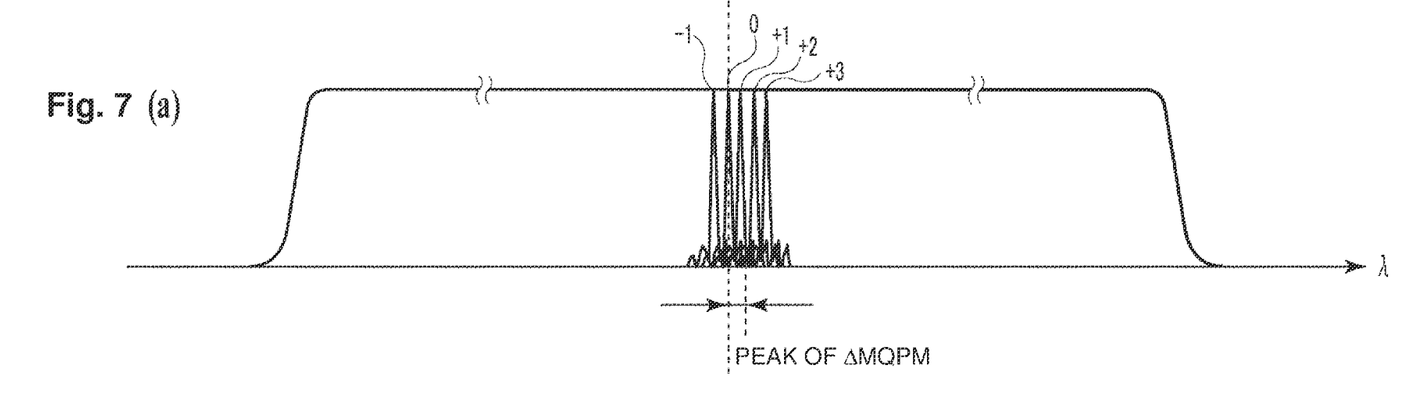
FIG. 7(a) is a view for describing optical parametric amplification and a difference frequency generation (DFG) band according to the embodiment 2 of the present invention.
FIG. 7(b) is a view for describing the optical parametric amplification and the difference frequency generation (DFG) band according to the embodiment 2 of the present invention.

FIG. 7 shows conversion efficiency in the embodiment 2. Five peaks can be obtained by five periodic structures. The difference between the peaks is set to 10 GHz as an interval between the quasi phase matching wavelengths.

FIG. 7 is a view for describing an optical parametric amplification and a difference frequency generation (DFG) band when the PPLN element of the present invention having five quasi phase matching wavelengths is used. A fundamental wave light is a laser light having a single wavelength which is outputted from a single laser light source (FIG. 7(b)).

With the use of the PPLN waveguide having a plurality of quasi phase matching wavelengths, by merely performing excitation using the generation of a single second harmonic generated from the single fundamental wave light, different amplification bands are generated corresponding to the plurality of respective quasi phase matching wavelengths, and these bands are synthesized and hence, a broad amplification band which cannot be realized by the conventional configuration can be realized (FIG. 7(a)).

In the embodiment 1 and the embodiment 2, lithium niobate ($LiNbO_3$) is used as a material of the waveguide of the periodically poled second-order nonlinear optical element. However, the material is not limited to the lithium niobate. A second-order nonlinear optical material represented by lithium tantalite ($LiTaO_3$), a mixed crystal of lithium niobate and lithium tantalite ($LiNb_{(x)}Ta_{(1-x)}O_3(0 \leq x \leq 1)$), potassium niobate ($KNbO_3$), potassium titanyl sulfuric acid ($KTiOPO_4$) and mixtures of these materials can be used. At least one of Mg, Zn, Sc, In and Fe may be contained in the second-order nonlinear optical material as a dopant.

In the embodiment 1 and the embodiment 2, the configuration where excitation is performed by an excitation light having a plurality of carriers and the configuration where the excitation is performed using a PPLN waveguide having a plurality of quasi phase matching wavelengths have been described individually. However, the present invention also include the combination of these configurations.

INDUSTRIAL APPLICABILITY

The present invention is applicable to an optical signal processing device which can perform wavelength conversion or optical amplification used in an optical communication system and a laser apparatus.

The invention claimed is:

1. An optical signal processing device comprising:
a light source which generates a fundamental wave light;
an optical modulator which modulates the fundamental wave light, and generates a fundamental wave light having a plurality of carriers which are synchronized in phase;
an optical filter which transmits required components among the plurality of carriers;
a first second-order nonlinear optical element on which a light which passes through the optical filter is incident, and which generates a second harmonic of the fundamental wave light; and
a second second-order nonlinear optical element on which a signal light and the second harmonic are incident, and which performs nondegenerate parametric amplification, wherein
a waveguide of the first second-order nonlinear optical element and a waveguide of the first second-order nonlinear optical element have a periodically poled structure, and the second second-order nonlinear optical element has an output unit for picking up a wavelength converted light corresponding to difference in frequency between the signal light and the second harmonic or an amplified light of the signal light, the optical signal processing device further comprising a quasi-phase matching wavelength conversion element which is a wavelength conversion device which generates a differential frequency light having a wavelength $\lambda_2$ which corresponds to differential frequency between the signal light having a wavelength $\lambda_1$ and an excitation light having a wavelength $\lambda_3$, and performs parametric amplification of the signal light having the wavelength $\lambda_1$, the wavelength conversion device including: means for generating excitation lights having wavelengths $\lambda_{3,i}$ (i=−n , , , −2, −1, 0, +1, +2 , , , +n); and means for multiplexing the excitation lights and the signal light, the wavelength conversion device being configured such that the signal light having the wavelength $\lambda_1$ and the excitation lights having the wavelengths $\lambda_{3,i}$ are incident on the wavelength conversion device and the wavelength conversion device performs parametric amplification of the signal light using the excitation lights, and assuming a modulation cycle of spatial distribution of a nonlinear constant of the quasi phase matching wavelength conversion element as $\Lambda$, a following equation is satisfied between a propagation constant $\beta(\lambda_{QPM})$ at a quasi-phase matching wavelength $\lambda_{QPM}$ and a propagation constant $\beta(2\lambda_{QPM})$ at a wavelength $2\lambda_{QPM}$, $$\beta(\lambda_{QPM}) - 2\beta(2\lambda_{QPM}) = \frac{2\pi}{\Lambda}$$

at least one of the wavelengths $\lambda_{3,i}$ of the excitation lights has a shorter wavelength than the quasi phase matching wavelength $\lambda_{QPM}$, and a following equation is satisfied between a propagation constant $\beta(\lambda_{3,i})$ at the wavelength $\lambda_3$ of the excitation light, a propagation constant $\beta(\lambda_1)$ at the wavelength $\lambda_1$ of the signal light and a propagation constant $\beta(\lambda_2)$ at the wavelength $\lambda_2$ of the differential frequency light, $$\beta(\lambda_{3,i}) - \beta(\lambda_1) - \beta(\lambda_2) = \frac{2\pi}{\Lambda}.$$

2. The optical signal processing device according to claim 1, wherein the quasi phase matching wavelength conversion element is a waveguide which is made of lithium niobate having a periodically poled structure, and the quasi phase matching wavelength conversion element generates the wavelength $\lambda_2$ of the differential frequency light which satisfies a following equation by a second-order nonlinear optical effect generated in the nonlinear medium, $$\frac{1}{\lambda_3} = \frac{1}{\lambda_1} + \frac{1}{\lambda_2}.$$

3. The optical signal processing device according to claim 1, wherein the means for generating the excitation lights having the wavelength $\lambda_{3,i}$ (i=−n , , , −2, −1, 0, +1, +2 , , , +n) includes: a light source which generates a fundamental wave light having a wavelength $2\lambda_{3,0}$; an optical modulator; an optical filter; and an optical amplifier, and the means generates the excitation lights by generating a second harmonic of the fundamental wave light.

4. The optical signal processing device according to claim 1, wherein a nonlinear optical crystal of the waveguides of the first second-order nonlinear optical element and the second second-order nonlinear optical element is $LiNbO_3$, $LiTaO_3$, or $LiNb_{(x)}Ta_{(1-x)}O_3$ (0≤x≤1), or a mixture of $LiNbO_3$, $LiTaO_3$, and $LiNb_{(x)}Ta_{(1-x)}O_3$ (0≤x≤1).

5. The optical signal processing device according to claim 4, wherein the waveguide contains at least one dopant selected from a group consisting of Mg, Zn, Sc and In.

6. An optical signal processing device comprising:
a light source which generates a fundamental wave light;
a first second-order nonlinear optical element which generates a second harmonic of the fundamental wave light; and
a second second-order nonlinear optical element on which a signal light and the second harmonic are incident, and which performs nondegenerate parametric amplification, wherein
the second second-order nonlinear optical element has an output unit for picking up a wavelength converted light corresponding to difference in frequency between the signal light and the second harmonic or an amplified light of the signal light,
a waveguide of the first second-order nonlinear optical element and a waveguide of the first second-order nonlinear optical element have a periodically poled structure, and
in the waveguide of the second second-order nonlinear optical element, the periodically poled structure is formed of periodic structures having different lengths which are arranged in multiple stages,
the optical signal processing device further comprising a quasi-phase matching wavelength conversion element which is a wavelength conversion device which generates a differential frequency light having a wavelength $\lambda_2$ which corresponds to differential frequency between the signal light having a wavelength $\lambda_1$ and an excitation light having a wavelength $\lambda_3$, and performs parametric amplification of the signal light having the wavelength $\lambda_1$, the wavelength conversion device including: means for generating excitation lights having wavelengths $\lambda_3$; and means for multiplexing the excitation lights and the signal light, the wavelength conversion device being configured such that the signal light having the wavelength $\lambda_1$ and the excitation lights having the wavelengths $\lambda_{3,i}$ are incident on the wavelength conversion device and the wavelength conversion device performs parametric amplification of the signal light using the excitation lights, and
assuming a modulation cycle of spatial distribution of a nonlinear constant of the quasi phase matching wavelength conversion element as $\Lambda i$ (i=−n , , , −2, −1, 0, +1, +2 , , , +n), a following equation is satisfied between a propagation constant $\beta(\lambda_{QPM,i})$ at a quasi-phase matching wavelength $\lambda_{QPMi}$ and a propagation constant $\beta(2\lambda_{QPM,i})$ at a wavelength $2\lambda_{QPM,i}$, $$\beta(\lambda_{QPM,i}) - 2\beta(2\lambda_{QPM,i}) = \frac{2\pi}{\Lambda i},$$

at least one of the wavelengths $2\lambda_{QPM,i}$ of the modulation frequency of the excitation light has a longer wavelength than the quasi phase matching wavelength $\lambda_3$, and a following equation is satisfied between the propagation constant $\beta(\lambda_3)$ at the wavelength $\lambda_3$ of the excitation light, the propagation constant $\beta(\lambda_1)$ at the wavelength $\lambda_1$ of the signal light and the propagation constant $\beta(\lambda_2)$ at the wavelength $\lambda_2$ of the differential frequency light, $$\beta(\lambda_3) - \beta(\lambda_1) - \beta(\lambda_2) = \frac{2\pi}{\Lambda i}.$$

7. The optical signal processing device according to claim 6, wherein the quasi phase matching wavelength conversion element is a waveguide which is made of lithium niobate having a periodically poled structure, and the quasi phase matching wavelength conversion element generates the wavelength $\lambda_2$ of the differential frequency light which satisfies a following equation by a second-order nonlinear optical effect generated in the nonlinear medium, $$\frac{1}{\lambda_3} = \frac{1}{\lambda_1} + \frac{1}{\lambda_2}.$$

8. The optical signal processing device according to claim 6, wherein a nonlinear optical crystal of the waveguides of the first second-order nonlinear optical element and the second second-order nonlinear optical element is $LiNbO_3$, $LiTaO_3$, or $LiNb_{(x)}Ta_{(1-x)}O_3$ ($0 \leq x \leq 1$), or a mixture of $LiNbO_3$, $LiTaO_3$, and $LiNb_{(x)}Ta_{(1-x)}O_3$ ($0 \leq x \leq 1$).

* * * * *